(12) United States Patent
Porte

(10) Patent No.: US 8,024,221 B2
(45) Date of Patent: *Sep. 20, 2011

(54) SYSTEM AND METHOD FOR DELIVERING PAYLOADS SUCH AS ADS

(75) Inventor: Alexander Porte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/873,846

(22) Filed: Sep. 1, 2010

(65) Prior Publication Data

US 2010/0332322 A1 Dec. 30, 2010

Related U.S. Application Data

(63) Continuation of application No. 10/368,239, filed on Feb. 18, 2003, now Pat. No. 7,813,957.

(51) Int. Cl.
*G06Q 30/00* (2006.01)

(52) U.S. Cl. ............... 705/14.4; 705/14.41; 705/14.52; 705/10; 705/8; 725/22; 725/32; 709/240

(58) Field of Classification Search ............... 705/14.61, 705/14.46, 14.42, 14.53, 14.66, 14.67
See application file for complete search history.

(56) References Cited

U.S. PATENT DOCUMENTS

| | | | |
|---|---|---|---|
| 6,026,368 A | 2/2000 | Brown et al. | |
| 6,026,369 A | 2/2000 | Capek | |
| 6,119,101 A | 9/2000 | Peckover | |
| 6,332,127 B1 | 12/2001 | Bandera et al. | |
| 6,334,109 B1 | 12/2001 | Kanevsky et al. | |
| 6,990,462 B1 | 1/2006 | Wilcox et al. | |
| 7,039,599 B2 | 5/2006 | Merriman et al. | |
| 7,136,871 B2 | 11/2006 | Ozer et al. | |
| 2002/0103698 A1 | 8/2002 | Cantrell | |
| 2002/0128904 A1 | 9/2002 | Carruthers et al. | |
| 2002/0133397 A1 | 9/2002 | Wilkins | |
| 2002/0133398 A1 | 9/2002 | Geller et al. | |
| 2003/0101454 A1 | 5/2003 | Ozer et al. | |
| 2003/0130887 A1* | 7/2003 | Nathaniel | 705/14 |
| 2003/0171990 A1* | 9/2003 | Rao et al. | 705/14 |
| 2004/0078809 A1 | 4/2004 | Drazin | |
| 2006/0015406 A1 | 1/2006 | Beyda et al. | |

FOREIGN PATENT DOCUMENTS

WO 9740447 A1 10/1997

OTHER PUBLICATIONS

Chickering D., et al., "Targeted Advertising with Inventory Management," EC, Oct. 17-20, 2000, pp. 145-149, Minneapolis, MN.
Risden, K., et al., "Interactive Advertising: Patterns of Use and Effectiveness," CHI, Apr. 18-23, 1998, pp. 219-224, Los Angeles, CA.
Nakamura, A., "Improvements in Practical Aspects of Optimally Scheduling Web Advertising," WWW, May 7-11, 2002, Honolulu, HI.

* cited by examiner

*Primary Examiner* — Khanh H Le
(74) *Attorney, Agent, or Firm* — Senniger Powers LLP

(57) ABSTRACT

A data structure defines a target profile for each ad which target profile specifies characteristics of a request to which the ad may be provided in response. An ad server delivers one or more of the plurality of payloads in response to a request from a target. A payload priority is assigned for each of the payloads as a function of a delivery goal of the payload and as a function of the number of times the payload has been delivered to a target. A particular payload is selected for delivery to the particular target as a function of the particular characteristics and as a function of the payload priorities.

19 Claims, 4 Drawing Sheets

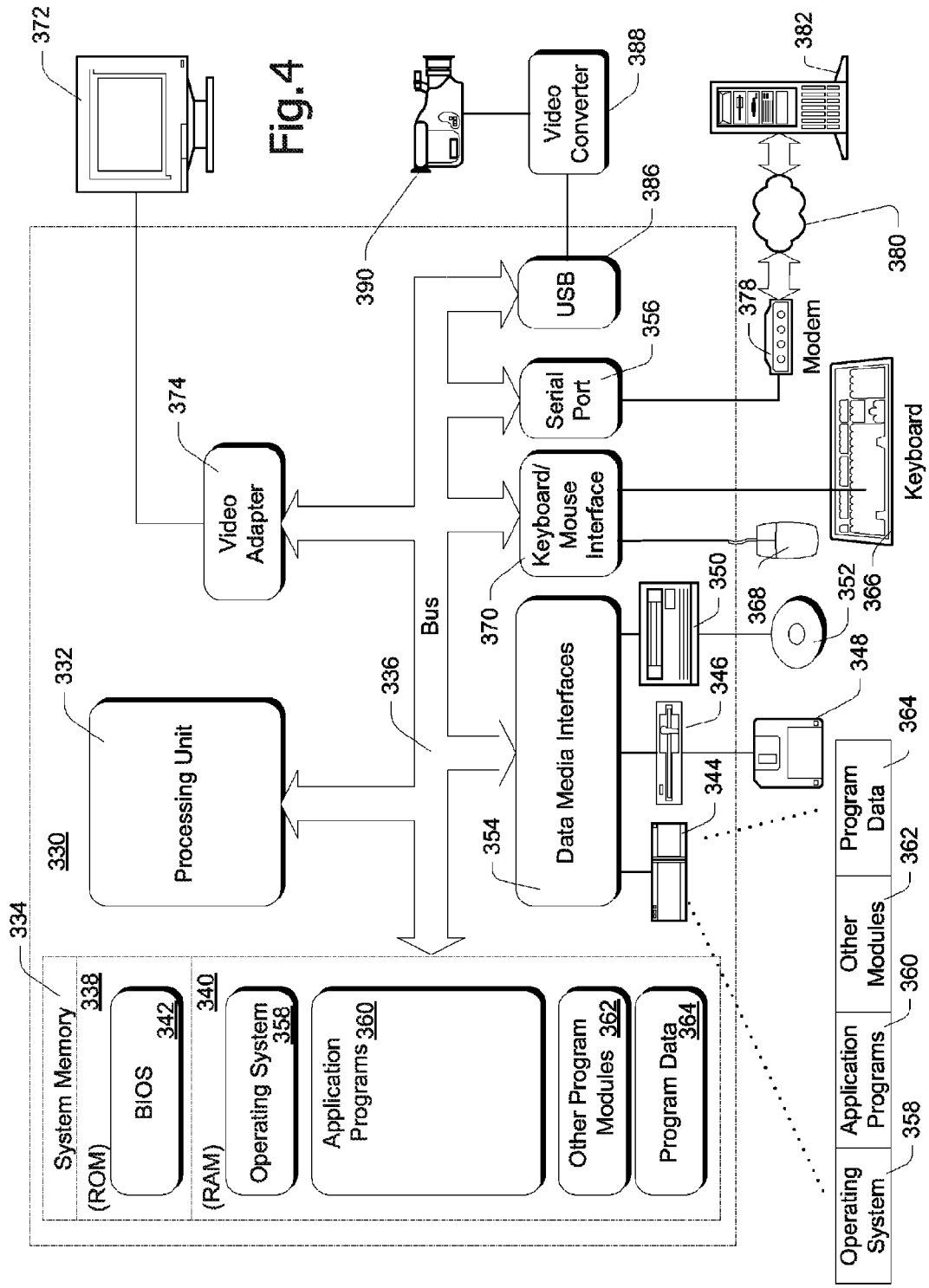

SYSTEM AND METHOD FOR DELIVERING PAYLOADS SUCH AS ADS

CROSS-REFERENCE TO RELATED APPLICATIONS

This application is a continuation of U.S. application Ser. No. 10/368,239 filed on Feb. 18, 2003, the entirety of which is incorporated herein by reference.

TECHNICAL FIELD

The present invention relates to the field of payload delivery and a system and method of delivering one or more of a plurality of payloads in response to a request from a target. In particular, this invention relates to a system and method for delivering one or more of a plurality of ads in response to a request from a client.

BACKGROUND OF THE INVENTION

In the past, ads have been delivered to clients on a somewhat random basis. When a request for an ad is received, the ad to be delivered is selected from an available list of ads. Each ad generally has a goal as to how many deliveries are desired so that the delivery of the ads is tracked to determine when an ad meets its goal. When the goal is met, the ad it taken off the list.

This approach is unable to compensate for high volumes and unable to implement varying goals for each ad. For these reasons, a system and method for delivering payloads according to individual goals for each of the payloads is desired to address one or more of these and other disadvantages.

SUMMARY OF THE INVENTION

In embodiments, the invention delivers one or more of a plurality of payloads to a plurality of targets in response to requests from the targets. The payloads each have a priority assigned thereto as a function of a delivery goal of the payload. The targets each have different particular characteristics. The number of times each payload is delivered to a target is tracked. An on schedule priority is assigned for at least a first one of the payloads as a function of the delivery goal of the payload. The delivery goal of the at least first one of the payloads comprises a constant goal. An ahead of schedule priority is assigned for at least a second one of the payloads as a function of the delivery goal of the payload. The delivery goal of the at least second one of the payloads is a goal that is not the constant goal. A behind schedule priority is assigned for at least a third one of the payloads as a function of the delivery goal of the payload. The delivery goal of the at least third one of the payloads is a goal that is not the constant goal. A particular request is received from a particular target having particular characteristics. A particular payload is selected for delivery to the particular target as a function of the particular characteristics of the particular target and as a function of the payload priority of the particular payload.

Embodiments of the invention are further directed to delivering one or more of a plurality of payloads to a plurality of targets having different particular characteristics in response to requests from the targets. The number of times each payload is delivered to a defined target is tracked and a payload priority is assigned for each of the payloads as a function of the delivery goal of the payload and as a function of the number of times the payload has been delivered to a target. The delivery goal of at least one of the payloads comprises a percentage goal, and each payload having the percentage goal is assigned a payload priority based on a percentage of the tracked number of times said payload has been delivered to the target divided by the total number of payload requests from the targets to which the payload may be delivered. A plurality of requests is received from the plurality of targets having different particular characteristics. For each request from a particular target having particular characteristics, available payloads are determined as a function of the particular characteristics of the particular target as compared to the target characteristics associated with each of the payloads. A particular payload is selected from the available payloads for delivery to the particular target as a function of a comparison of the payload priority of each of the available payloads.

Embodiments of the invention are further directed to a system for delivering a plurality of ads to a plurality of targets having different particular characteristics in response to a plurality of requests from the targets. The system has a memory area storing a data structure defining a target profile for each ad. The target profile specifies characteristics of a request to which the ad may be provided in response. The system also includes a processor programmed for tracking the number of times each ad is delivered to a target and for assigning an ad priority for each of the ads as a function of a delivery goal of the ad. The delivery goal of at least one of the ads comprises at least one of a constant goal, wherein the ad is assigned an on schedule priority, and a percentage goal, wherein each ad is assigned an ad priority based on a percentage of the tracked number of times the ad has been delivered to the target divided by the total number of ad requests from the targets to which the payload may be delivered. The processor is also programmed for receiving a plurality of requests from said plurality of targets and for selecting a particular ad from the plurality of ads for delivery to the particular target as a function of the particular characteristics of the particular target and as a function of the ad priority of the particular ad as compared to the priorities of the other ads.

Other features will be in part apparent and in part pointed out hereinafter.

BRIEF DESCRIPTION OF THE DRAWINGS

FIG. 4 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
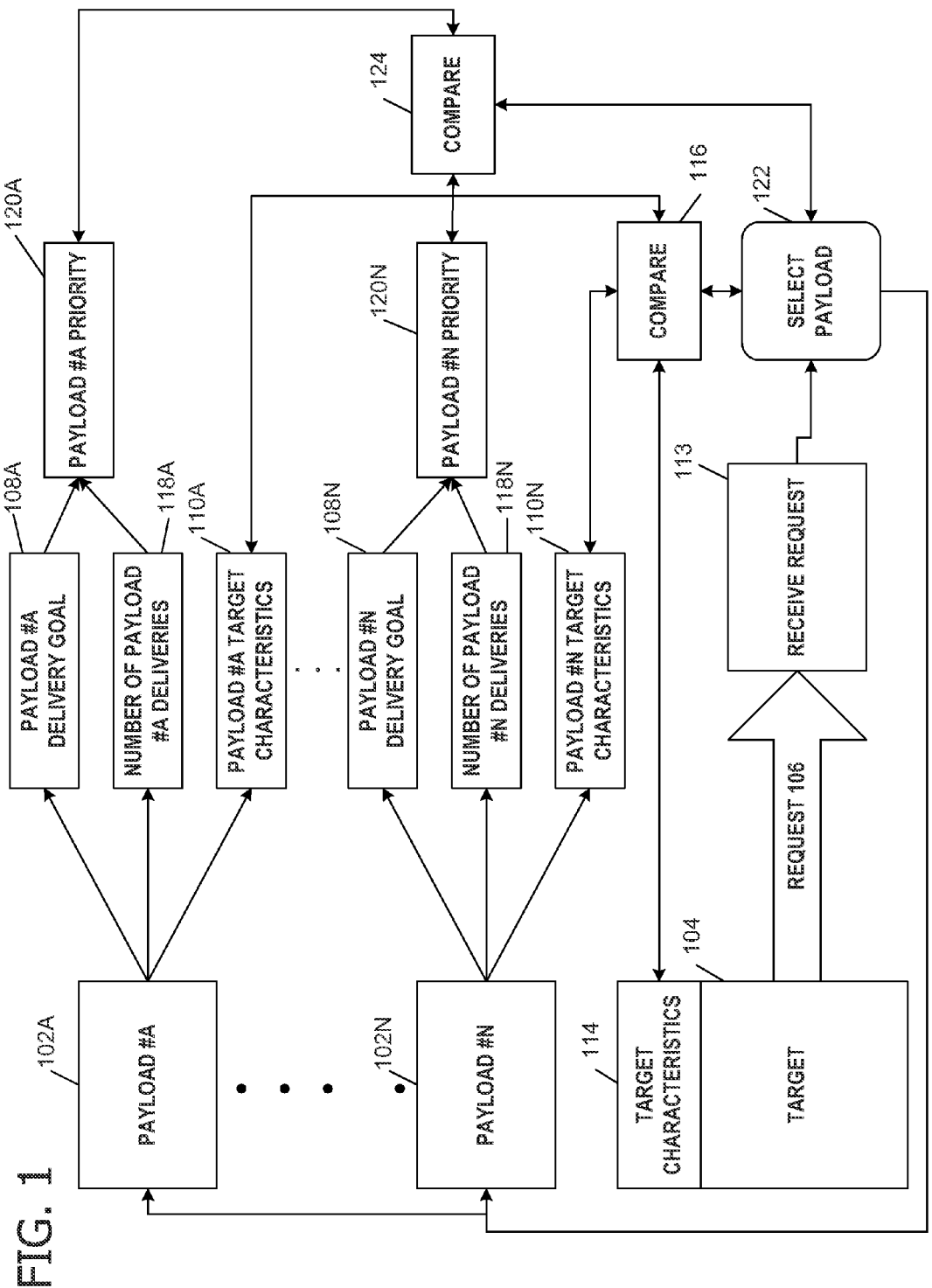
FIG. 1 is an exemplary embodiment of one preferred embodiment of the invention in the form of a flow chart illustrating payloads A to N and the process of selecting one of the payloads to be delivered in response to a target providing a request.

Referring first to FIG. 1, an exemplary embodiment of the invention in the form of a flow chart is illustrated. In the system, payloads A to N 102 have been identified or otherwise are available for delivery to a target and the process of selecting one of the payloads to be delivered in response to a target 104 providing a request 106. For example, as noted below, the payloads may ads to be distributed as banners to clients and the requests may be the client accessing a host website. When a client or target connects to the host website, the connection is viewed as a request for information which may include a banner ad.

In such systems, each payload 102 would have a delivery goal 108 which may be specified by the source of the ad. For example, a retailer may pay a host to provide its banner ad to 10,000 clients so that the delivery goal would be 10,000. In addition, target characteristics 110 would be associated with each of the payloads 102. The characteristics 110 may be specified by the source of the ad and would define the characteristics of targets 104 to which the payload may be delivered. As an example, the retailer may specify that its banner ad should only be provided to clients having certain email addresses.

When a particular request 106 from a particular target 104 is received (at 113), the target may have particular characteristics 114 which can be determined by referring to a database or which may be identified by the request itself. For example, a database may have information about the target that indicates that the target is a client computer used by a male of age 30-35 or the target may have a name, such as xyz@hotmail.com which identifies a characteristic (e.g., from a hotmail.com subscriber). Determining target characteristics of a request will be described in more detail below with regard to FIG. 3 and the search tree. Once the target characteristics 114 of the target 104 are known, payloads 110 which would be available for delivery to the target can be determined. The target characteristics 114 of the target 104 are compared as indicated by 116 to the target characteristics 110 of each payload. Any payload having target characteristics 110 which correspond to the target characteristics 114 of the target 104 may be provided to the target. For example, if payload #A has target characteristics 110A requiring that the target have an "@hotmail" address, and if payload #N has target characteristics 110A requiring that the target be male, assuming xyz is known to be a male, either payload #A and/or payload #N may be provided to target 104. In general, the available payloads 102 which may be provided to a target are a function of the particular characteristics of the particular target as compared to the target characteristics associated with each of the payloads.

In order to determine if a payload 102 has been delivered in accordance with its goal 108, the number of times each payload 102 is delivered to a target 104 is tracked at 118. Based on the goal 108 for each payload 102 and based on the number of deliveries 118 of the payload, a score or priority 120 is assigned to each payload 102. In general, the priority for each of the payloads is a function of the delivery goal of the payload and is a function of the number of times the payload has been delivered to a target.

Finally, one or more particular payloads 102 is selected for delivery to the target 104. The payload or payloads to be delivered is selected from the available payloads which have target characteristics 110 which correspond to the target characteristics 114 of the target 104. In general, a particular payload is selected at 122 for delivery to the particular target as a function of a comparison 124 of the payload priority of each of the available payloads. For example, if each payload is given a numeral score indicating its priority, the payload with the highest score is selected.

After a particular payload is delivered, its number of payload deliveries 118 is incremented by one (1) for each target that received it and its payload priority 120 is recalculated based on the new number of deliveries. As noted below, this recalculation may occur at intervals such as every five (5) seconds, although other intervals or continuous recalculation are also contemplated. In general, the ad priority is recalculated on a periodic basis taking into account any changes in the number of deliveries since the last recalculation.

Figure 2:
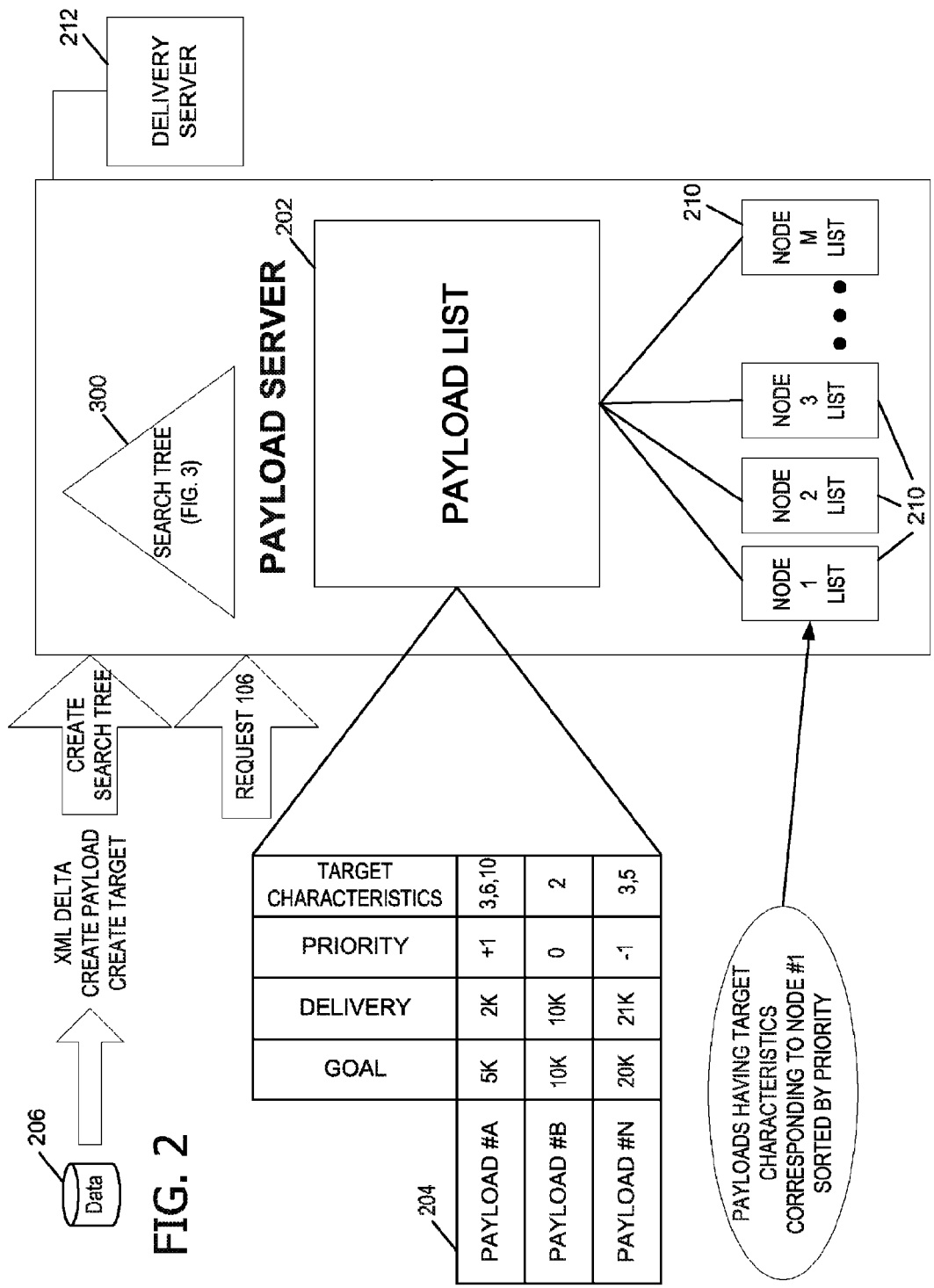
FIG. 2 is an exemplary block diagram illustrating a payload server according to the invention.

Referring next to FIG. 2, an exemplary block diagram illustrating a payload server 200 according to the invention is shown. The server 200 includes a payload list 202 of each payload that is available for delivery. As indicated by table 204, the list 202 includes a data structure for each payload identifying its goal, the number of times its been delivered, its priority based on the goal and delivery and its target characteristics. For example, as shown in table 204, payload #A has a goal of 5,000 (5K) and has been delivered 2,000 times (2K). It has been assigned a priority of −1 indicating that its number of deliveries is less than its goal so that it is behind schedule. In addition, table 204 indicates that characteristics 3, 6, and 10 (arbitrary numbers used for example only) are the target characteristics meaning that payload #A should be delivered to targets having characteristics 3, 6 and 10.

Initially, the server 200 is provided with data 206 which includes instructions to create a payload, instructions to create a target and delta information (defining a payload goal) in XML data format. For example, the server may be provided with the following:

```
XML Delta
<?xml version="1.0" ?>
<Message xmlns="microsoft-adpoint-dtxschema" ID="47">
    <CreatePayload CatalogGroupID="1" CatalogID="1" ID="6"
        ProgID="Microsoft.AdPoint.PS.Payloads.Payload">
        <Payload>
            <GoalList>
                <GoalFlatRate ID="1" Start="2001-01-01T00:00:00"
                    End="2003-01-01T00:00:00"
                    Impression="100000000" />
            </GoalList>
            <Context ID="0" Root="true">
                <Creative ID="0" Start="2001-01-01T00:00:00"
                    End="2010-01-01T00:00:00" Weight="50" />
                <Creative ID="1" Start="2001-01-01T00:00:00"
                    End="2010-01-01T00:00:00" Weight="100" />
            </Context>
        </Payload>
        <PayloadMapping ConditionGroupID="2" ContextID="0" />
    </CreatePayload>
</Message>
```

This information is used by the server 200 to create a search tree 300 (see FIG. 3) which determines which characteristics a particular request 106 has. Each node of the search tree corresponds to a characteristic of the request. At regular intervals, the payload list 202 is sorted into nodes lists which is a list of payloads having target characteristics corresponding to the characteristics of the node. The payloads within each node list 210 are sorted by priority. For example, assume that a request that comes from hotmail.com has characteristic 3 and falls into node 3. When sorting the payloads in table 204, payloads #A and #N include characteristic 3 and would be listed in the node 3 list. Since payload #A has a higher priority than payload #N, server 200 would indicate to a delivery server 212 that payload #A should be provided to the assumed hotmail.com request.

As noted above, in one preferred embodiment according to the invention, the payloads are ads. Thus, FIG. 2 illustrates a system for delivering a plurality of ads in response to a plurality of requests. Server 200 includes a data structure as illustrated by table 204 defining target characteristics (e.g., a target profile) for each ad (payload) which target profile specifies characteristics of a request to which the ad may be provided in response. The data structure also specifies a delivery goal for each ad; indicates the number of times each ad is delivered in response to a request and defines an ad priority for each ad as a function of the delivery goal of the ad and as a function of the number of times the ad has been delivered. Server 200 receives requests 106 and maintains an ad list (payload list 202) specifying an ad priority of each ad. Server 202 selects a particular ad for delivery in response to a request by referring to the node list. When the particular request has characteristics which correspond to a particular node list and when a specific ad has an ad priority equal to or greater than the ad priority of other ads in the node list, the specific ad is delivered to the request by the delivery server.

Figure 3:
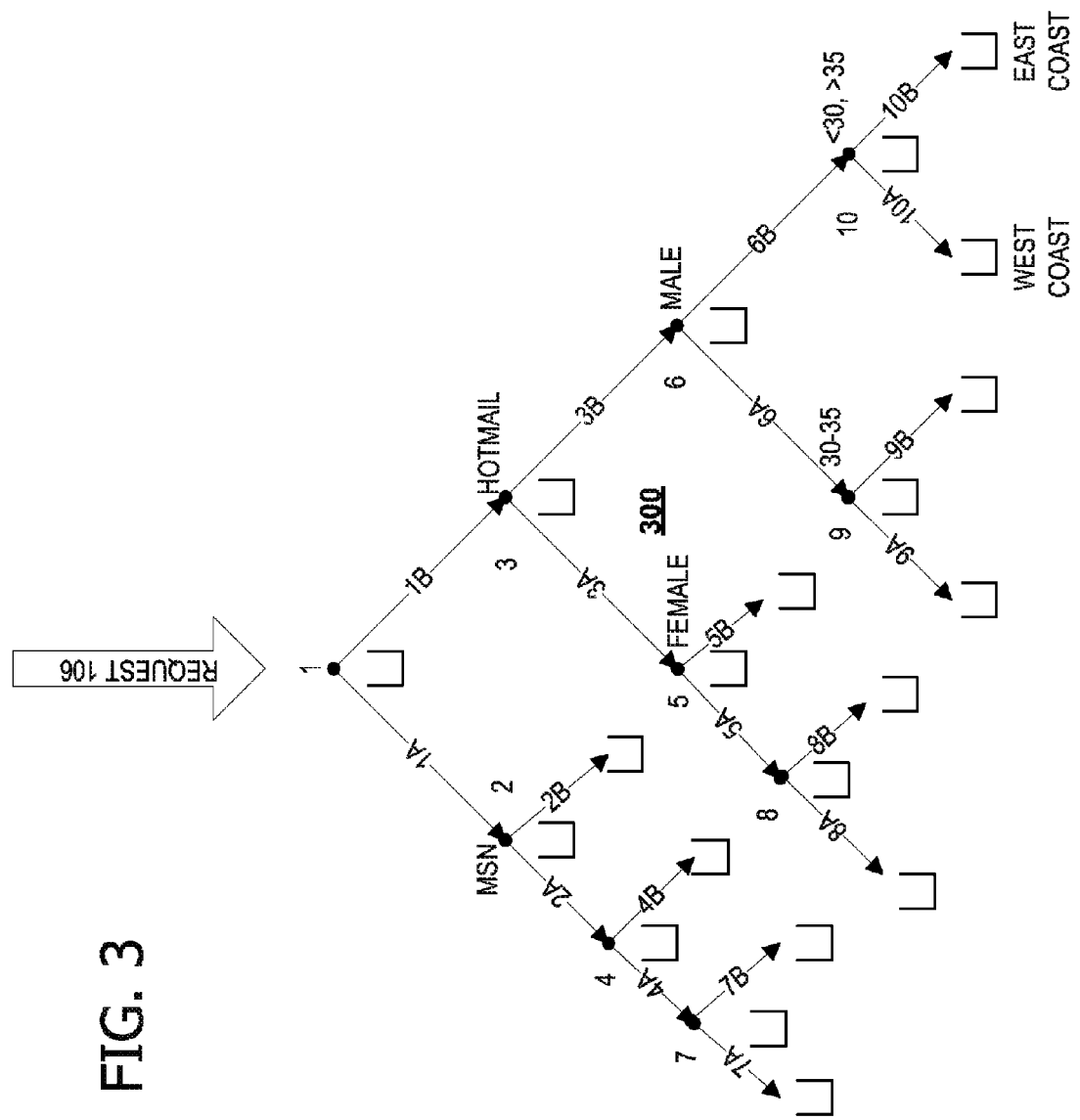
FIG. 3 is an exemplary flow chart illustrating a search tree used by the payload server according to the invention for determining the characteristics of a request.

FIG. 3 is an exemplary flow chart illustrating the search tree 300 used by the payload server according to the invention for determining the characteristics of a request. Each node 1-10 is a decision point. The first decision at node 1 is whether the incoming request is from MSN or HOTMAIL. Either way, the request goes into bucket 1 and is sorted as part of the node 1 list, which is a default location for requests, and considers the payload (or group of payloads) with the highest priority. If the request is from HOTMAIL, the decision process proceeds to node 3 to determine whether the request is from a male or female. Either way it goes into bucket 3 and takes into consideration the payload (or group of payloads) with the highest priority only if this priority is higher than the payload already considered previously (bucket 1). If the request is from a male, it goes bucket 9 if 30-35, otherwise bucket 10. Either way, it goes into bucket 6 and applies the same logic as in bucket 3. If the request is from a female, it goes into bucket 5 or a subsequent bucket (e.g., bucket 8). If the request is from MSN, the decision process proceeds to nodes 2, 4 and or 7 for additional determinations. At the end of the search the logic returns the highest priority payload encountered during the tree traversal or a random payload if it encountered a group of payload having the same priority.

Periodically, the buckets are sorted by priority to generate the node lists. The highest priority request in each node list is then sent to the request having characteristics corresponding to the node characteristics.

Assigning Priority (Scoring)

Scoring according to the invention provides a uniform way to compare the availability of payloads. This allows the payload server 200 to choose the payload having the highest score, meaning that this payload is the one that needs to be served the most.

With this uniform scoring scheme implemented in each payload present in the system, the payload server may be generic and can be visualized as a big basket full of payloads that compete against each other, creating a dynamic system. Each payload is independent and has no knowledge of the others, i.e., its priority is independent of the priority of the other payloads. The score of each payload is increased or decreased depending on its goals and its own selection behavior (past and expected). This approach simplifies the system.

For such a system to be able to handle all payloads on the same basis, all the payloads must implement a scoring scheme that is compatible with the others. If one payload uses an unfair scoring algorithm, it will be able to take all the requests coming in by having an extremely high score and the other payloads will starve. The scoring algorithms have to produce a single score per payload that can be compared fairly with other scores. It need not be dependent on the delivery behavior nor date range, etc.

The varying score of each payload is a way for each payload to tune its delivery rate. Since each payload is responsible for adjusting its own delivery rate fairly and on the same basis as the other payloads, the entire system tends to converge to equilibrium so that the delivery requirements of all the payloads are met in an equitable manner. With this system according to the invention, a payload can be added or removed anytime. This may temporarily introduce a disharmony in the system that breaks the equilibrium previously reached, but the system will adjust itself and reach a new equilibrium quickly.

Scoring Framework (Payload Availability Architecture)

Each payload has its own delivery scheme it follows. According to the invention, the delivery server scoring framework is separated from the individual payloads goal. The server is generic, simple and does not require a central scheduling mechanism that has to deal with tens of thousands of different delivery requirements, as in the prior art. The payloads use the scoring framework and apply scoring formulas to tune their delivery rate over time to follow predefined behavior. The scheduling complexity is addressed by the system using mathematical convergence of each "competing" goal entity.

Periodically, the payload server starts a refresh cycle that will call each payload and update their score individually and independently of the rest of the system. The precision of the payload delivery behavior is partially related to the refresh frequency cycle.

In order for each payload to calculate its score the payload server provides some information to allow it to score itself accurately:

The ImpressionCount of the payload. This is the number of times this particular payload was selected in the past (e.g., the number of payload deliveries 118 in FIG. 1).

The ViewCount for the target to which the payload is mapped. This is the number of requests that came in and met the condition requirements of the target mapped to this payload. It can be interpreted as the number of opportunities this payload had to be selected.

The CurrentTime of the refresh. Since scores fluctuate over time, the payload server has to give the current time to the payload being refreshed in order for it to calculate its score according to it delivery behavior.

The ViewCountGraph for the target to which the payload is mapped. This is an array of predicted ViewCount for the upcoming week for this target. This array is provided by an external capacity prediction system and is used by special delivery schemes in order to work properly. The impression goal delivery behavior noted below is one such special delivery scheme that tries to predict how it has to spread its impression over time to have a smooth delivery.

The score (payload priority 120 in FIG. 1) is calculated using those four provided parameters and the payload goal 108. The result is a single value between −1 and 1 (the range can easily be change by multiplying the result score by an arbitrary number). A score equal to zero means that the payload is on schedule to meet its requirement and can be served. A negative score indicates that the payload is ahead of schedule (was selected too many times) and should not be served until the score becomes positive again. A score greater than zero means that the payload is behind schedule and needs to be served more; larger the number, the more it needs to be served.

In a perfect system where there are enough requests to satisfy all payloads delivery goals (no starvation), all scores of all payloads should fluctuate very close around zero. This property can be used to implement a trigger to detect system problems like payload starvation.

If several payloads have the exact same score during the selection, the payload server has to pick one at random in order to keep the selection fairness. This is particularly important for delivery schemes where the goal is constant (see below).

Payload Goal Architecture

At every payload server refresh cycle, each payload adjusts its score to regulate its selection rate in accordance with the delivery schema assigned to it.

The delivery schemes are described by a list of goals. Each one of those goals represents a delivery type the payload has to follow until the goal is fulfilled or ends.

The content of those goals are completely generic and depend on what needs to be done to meet the delivery goal. We will go into these details for each goal type later.

The only constraint on the goal list is that at any point in time only one goal (or no goal) is active (no goal overlap).

A Carry-Over mechanism is used between goals to give the ability to impression count based goal types to carry over unused impressions to the next goal. This is used in case of a temporary starvation to still fulfill the overall impression goal number but spread over multiple goals. It adds a little more flexibility to the system.

Example

Payload
GoalImpression Start="1/5/2001" End="1/6/2001" Goal="10000"
GoalImpression Start="1/10/2001" End="1/15/2001" Goal="20000"

If this payload is loaded in the system on the 1/1/2001 it will stay inactive between 1/1/2001-1/4/2001.

On the 1/5/2001 it will be activated for 2 days trying to fulfill its goal of 10,000 impressions. During this period this payload will compete with others trying to deliver smoothly and equitably by following the predicted curve (refer to the GoalImpression section for more details).

Between 1/7/2001-1/9/2001 the payload will be inactive again waiting for its next goal to become active.

Between the 1/10/2001-1/15/2001 the payload will be active trying to meet its last goal of 20,000 plus the carry-over from its previous goal (it can be positive or negative depending if it was over or under-delivered).

At the end of its last goal the payload will be deactivated from the system.

The payload activation period is determined by the union of all the goals contained in its list. It begins with its first goal and end with it last one.

More complex delivery behavior can be created over the lifetime of a payload by associating simple goal types in the payload list.

Constant Goal

The constant goal is the simplest delivery scheme; the score is always equal to zero and never fluctuates. Payloads using this delivery type will always be perceived as being on time.

Percentage Goal

This scoring scheme tries to grab a uniform piece of the pie, the pie being the number of requests that satisfy the target mapped to the payload.

As an example, if there were 1,000 requests satisfying the target last hour and the goal is 30% then it is expected that the payload have been selected 300 times (300 impression counts) over the last hour.

To achieve this delivery behavior, the percentage goal (ex: 30%) is compared with the percentage of requests the payload grabbed in the past (ratio of past impressions compared to the number of requests since the payload is active in the current goal).

nSelection: Number of successful selections since the beginning of the goal.
nPastRequest: Number of requests since the beginning of the goal (0<nRequest).
% Goal: Goal to achieve in percentage (0<% Goal<=1).

$$\text{Score} = \max(1-((\text{nSelection}/\text{nPastRequest})/\% \text{ Goal}), -1)$$

Impression Goal

The impression goal's purpose is to reach a particular number of selections by the end of the goal's lifetime. The selections have to be spread across the complete lifetime of the goal so that the piece of the request pie taken by this payload stays constant in percentage over time.

Example, if at a rate of 1,000 request per second the payload is selected 100 times per second then when the rate drops to 100 the payload selection drops to 10. The number of selections divided by the number of requests, also referred to as the selection ratio, always stays the same (0.1, or 10%).

In order to achieve these two sub goals (reach a set impression number and keep the % constant) the scoring for this goal relies on the predicted ViewCountGraph provided by the capacity prediction system in order to determine the number of predicted requests coming in during the lifetime of this goal. The precision of this goal depends heavily on the accuracy of this graph.

The impression goal algorithm is an extension of the percentage goal algorithm, above. Using the ImpressionGoal, PastImpression and FutureImpression (predicted) the algorithm converts the impression goal into a percentage one. This is achieved by using the past ratio and overall ratio (calculated using the predicted View Count graph provided).

nFutureRequest: Number of requests until the end of the goal (predicted).
% Past: Past selection ratio compared to the number of requests.
nGoal: Number of successful selection to reach.

$$\% \text{ Past} = \text{nSelection}/\text{nPastRequest}$$

$$\% \text{ Goal} = \min(\text{nGoal}/(\text{nPastRequest}+\text{nFutureRequest}), 1)$$

The % Goal is the ratio of the number of successful selections over the number of requests. This ratio is partly calculated using past data (nPastRequest) and predicted data (nFutureRequest).

Using % Past and % Goal ratios we can apply the same formula used in the percentage goal to obtain the score:

$$\text{Score} = \max(1-(\% \text{ Past}/\% \text{ Goal}), -1)$$

Since this goal is impression based, the initial impression goal takes in account the Carry-Over impression count goal that was not met in the previous goal. If the previous goal is over-delivered, the goal is lowered; if the previous goal is under-delivered and not met, it will be increased.

FlatRate Goal

This goal is impression based as well. Whereas the impression goal adjusts its delivery rate to keep its selection ratio constant, this goal adjusts its selection ratio to keep its delivery rate constant.

nCurrentGoal: Number of successful selections this payload should have reached at the current time to be right on schedule to meet the goal.

$$\text{nCurrentGoal} = (\text{nGoal}/(\text{EndTime}-\text{StartTime}))*(\text{CurrentTime}-\text{StartTime})$$

By comparing nCurrentGoal with the current number of successful selection, whether the payload is on time or not can be determined. If the payload is ahead, the score is set to the minimum (it is disabled); otherwise, the score is set to the maximum forcing it to show.

```
if ( nCurrentGoal <= nSelection )
{
Score = 1
}
else
{
Score = -1
}
```

This scoring approach seems much more aggressive than the previous ones but since the refresh cycles are occurring very often the macro delivery behavior of this payload is very smooth and the fairness of the system stays unaltered.

The selection throttling mechanism of the system, which comprises the various delivery goals as described above, is generic and allows each individual payload to manage its own selection goal. Since the system reaches equilibrium automatically, the scoring formulas stay very simple even for complex delivery, keeping high performance for the refresh cycle. Furthermore, this approach can be extended by introducing new payload goal types without increasing the complexity of the overall system.

FIG. 4 shows one example of a general purpose computing device in the form of a computer 130 which may be employed as a payload server according to the invention. In one embodiment of the invention, a computer such as the computer 330 is suitable for use in the other figures illustrated and described herein. Computer 330 has one or more processors or processing units 332 and a system memory 334. In the illustrated embodiment, a system bus 336 couples various system components including the system memory 334 to the processors 332. The bus 336 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 330 typically has at least some form of computer readable media. Computer readable media, which include both volatile and nonvolatile media, removable and non-removable media, may be any available medium that can be accessed by computer 330. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 330. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 334 includes computer storage media in the form of removable and/or non-removable, volatile and/or nonvolatile memory. In the illustrated embodiment, system memory 334 includes read only memory (ROM) 338 and random access memory (RAM) 340. A basic input/output system 342 (BIOS), containing the basic routines that help to transfer information between elements within computer 330, such as during start-up, is typically stored in ROM 338. RAM 340 typically contains data and/or program modules that are immediately accessible to and/or presently being operated on by processing unit 332. By way of example, and not limitation, FIG. 4 illustrates operating system 344, application programs 346, other program modules 348, and program data 350.

The computer 330 may also include other removable/non-removable, volatile/nonvolatile computer storage media. For example, FIG. 4 illustrates a hard disk drive 354 that reads from or writes to non-removable, nonvolatile magnetic media. FIG. 4 also shows a magnetic disk drive 356 that reads from or writes to a removable, nonvolatile magnetic disk 358, and an optical disk drive 360 that reads from or writes to a removable, nonvolatile optical disk 362 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 344, and magnetic disk drive 356 and optical disk drive 360 are typically connected to the system bus 336 by a non-volatile memory interface, such as interface 366.

The drives or other mass storage devices and their associated computer storage media discussed above and illustrated in FIG. 4, provide storage of computer readable instructions, data structures, program modules and other data for the computer 330. In FIG. 4, for example, hard disk drive 354 is illustrated as storing operating system 370, application programs 372, other program modules 374, and program data 376. Note that these components can either be the same as or different from operating system 344, application programs 346, other program modules 348, and program data 350. Operating system 370, application programs 372, other program modules 374, and program data 376 are given different numbers here to illustrate that, at a minimum, they are different copies.

A user may enter commands and information into computer 330 through input devices or user interface selection devices such as a keyboard 380 and a pointing device 382 (e.g., a mouse, trackball, pen, or touch pad). Other input devices (not shown) may include a microphone, joystick, game pad, satellite dish, scanner, or the like. These and other input devices are connected to processing unit 332 through a user input interface 384 that is coupled to system bus 336, but may be connected by other interface and bus structures, such as a parallel port, game port, or a Universal Serial Bus (USB). A monitor 388 or other type of display device is also connected to system bus 336 via an interface, such as a video interface 190. In addition to the monitor 388, computers often include other peripheral output devices (not shown) such as a printer and speakers, which may be connected through an output peripheral interface (not shown).

The computer 330 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 330. The logical connections depicted in FIG. 4 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 330 is connected to the LAN 196 through a network interface or adapter 386. When used in a wide area networking environment, computer 330 typically includes a modem 378 or other means for establishing communications over the WAN 198, such as the Internet. The modem 378, which may be internal or external, is connected to system bus 336 via the user input interface 194, or other appropriate mechanism. In a networked environment, program modules depicted relative to computer 330, or portions thereof, may be stored in a remote memory storage device (not shown). By way of example, and not limitation, FIG. 4 illustrates remote application programs 192 as residing on the memory device. It will be appreciated that the network connections shown are exemplary and other means of establishing a communications link between the computers may be used.

Generally, the data processors of computer 330 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 330, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 1 to deliver one or more of a plurality of payloads in response to a request from a target according to the following method:

tracking the number of times each payload is delivered to a target;

assigning a payload priority for each of the payloads as a function of a delivery goal of the payload and as a function of the number of times the payload has been delivered to a target;

receiving a particular request from a particular target having particular characteristics;

selecting a particular payload for delivery to the particular target as a function of the particular characteristics and as a function of the payload priorities.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A computer method executed by a processor of a computing device for delivering one or more of a plurality of payloads to a plurality of targets in response to requests from the targets, the payloads each having a priority assigned thereto as a function of a delivery goal of the payload, the targets each having different particular characteristics, the method comprising:

tracking, by the processor, the number of times each payload is delivered to a target;

assigning, by the processor, an on schedule priority for at least a first one of the payloads as a function of the delivery goal of the payload, wherein the delivery goal of the at least first one of the payloads comprises a constant goal;

assigning, by the processor, an ahead of schedule priority for at least a second one of the payloads as a function of the delivery goal of the payload, wherein the delivery goal of the at least second one of the payloads is a goal that is not the constant goal;

assigning, by the processor, a behind schedule priority for at least a third one of the payloads as a function of the delivery goal of the payload, wherein the delivery goal of the at least third one of the payloads is a goal that is not the constant goal;

wherein the assigned priority for each of the at least second or third ones of the payloads whose delivery goal is not the constant goal is a function of the number of times the payload has been delivered to a target;

receiving, by the processor, a particular request from a particular target having particular characteristics; and selecting, by the processor, a particular payload for delivery to the particular target as a function of the particular characteristics of the particular target and as a function of the assigned payload priority of the particular payload.

2. The computer method of claim 1 wherein the assigned payload priority comprises one of the following: an on schedule priority, a behind schedule priority, the behind schedule priority being a higher priority than the on schedule priority, and a ahead of schedule priority, the ahead of schedule priority being a lower priority than the on schedule priority, wherein said selecting comprises selecting a payload having the behind schedule priority over a payload having the on schedule priority and over a payload having the ahead of schedule priority, and wherein said selecting comprises selecting a payload having the on schedule priority over a payload having the ahead of schedule priority.

3. The computer method of claim 2 further comprising randomly selecting one of a group of payloads when each payload of the group of payloads has the same priority.

4. A computer method executed by a processor of a payload server for delivering one or more of a plurality of payloads to a plurality of targets having different particular characteristics in response to requests from the targets, the method comprising said processor executing instructions for:

tracking the number of times each payload is delivered to a defined target;

assigning a payload priority for each of the payloads as a function of the delivery goal of the payload,
  wherein said delivery goal of at least one of the payloads comprises a percentage goal
  wherein each payload having the percentage goal is assigned a payload priority based on a percentage of the tracked number of times said payload has been delivered to the target divided by the total number of payload requests from the targets to which the payload may be delivered; and
  wherein said delivery goal of at least another one of the payloads comprises a constant goal wherein a payload having the constant goal is assigned an on schedule priority;

receiving a plurality of requests from said plurality of targets having different particular characteristics;

for each request from a particular target having particular characteristics, determining available payloads as a function of the particular characteristics of the particular target as compared to the target characteristics associated with each of the payloads; and selecting from the available payloads a particular payload for delivery to the particular target as a function of a comparison of the payload priority of each of the available payloads.

5. The computer method of claim 4 wherein the assigned payload priority comprises one of the following: a behind schedule priority, an on schedule priority, and an ahead of schedule priority, wherein said selecting comprises selecting a payload having the behind schedule priority over a payload having the on schedule priority and over a payload having the ahead of schedule priority, and said selecting comprises selecting a payload having the on schedule priority over a payload having the ahead of schedule priority.

6. The computer method of claim 5 wherein the specified delivery goal for certain payloads of the plurality of payloads comprises a constant goal, wherein each payload having the constant goal as its active goal is assigned the on schedule priority.

7. The computer method of claim 5 wherein the processor is further configured for randomly selecting one of a group of payloads when the each payload of the group of payloads has the same priority.

8. The computer method of claim 4 wherein the processor is further configured for keeping a payload list of the payload priority of each payload, said payload list being periodically updated based on the number of times a payload has been delivered compared to its goal.

9. The computer method of claim 4 wherein said determining comprises using a search tree to determine a correspondence between the particular characteristics of the particular target and the target characteristics of the payloads.

10. The computer method of claim 4 wherein the processor is further configured for recalculating, on a periodic basis, the payload priority of each of the payloads by taking into account any changes in the number of deliveries since the last recalculation.

11. A system for delivering a plurality of ads to a plurality of targets having different particular characteristics in response to a plurality of requests from the targets, the system comprising:

a memory area storing a data structure defining a target profile for each ad, said target profile specifying characteristics of a request to which the ad may be provided in response; and a processor programmed for:
  tracking the number of times each ad is delivered to a target;
  assigning an ad priority for each of the plurality of ads as a function of a delivery goal of the ad,
  wherein said delivery goal of at least one of the ads comprises a constant goal so that the at least one ad is assigned an on schedule priority, and
  wherein said delivery goal of at least another one of the ads comprises a percentage goal,
  wherein each ad having a percentage goal is assigned an ad priority based on a percentage of the tracked number of times the ad has been delivered to the target divided by the total number of ad requests from the targets to which the payload may be delivered;
  receiving a plurality of requests from said plurality of targets; and
  selecting a particular ad from the plurality of ads for delivery to the particular target as a function of the particular characteristics of the particular target and as a function of the ad priority of the particular ad as compared to the priorities of the other ads.

12. The system of claim 11 wherein the data structure stored in the memory area comprises:
  the delivery goal for each ad;
  the number of times each ad is delivered in response to a request; and
  the ad priority for each ad.

13. The system of claim 11 wherein the assigned ad priority comprises one of the following: a behind schedule priority, an on schedule priority, and an ahead of schedule priority, wherein the processor is programmed for selecting an ad having the behind schedule priority over an ad having the on schedule priority and over an ad having the ahead of schedule priority and said selecting comprises selecting an ad having the on schedule priority over an ad having the ahead of schedule priority.

14. The system of claim 13 wherein the processor is programmed for randomly selecting one of a group of ads when each ad of the group of ads has the same priority.

15. The system of claim 11 wherein the delivery goal for another particular ad comprises an impression goal having a lifetime, wherein the impression goal, when active, comprises a goal that the particular ad is delivered to a constant percentage of the requests to which its characteristics correspond over the lifetime of the goal.

16. The system of claim 11 wherein the delivery goal for another particular ad comprises a flatrate goal, wherein the flatrate goal, when active, comprises a goal that the particular ad is delivered at a constant rate to the target and is assigned an ad priority as a function of the number of times the ad has been delivered to the target.

17. The system of claim 11 wherein the processor is programmed for keeping an ad list of the priority of each ad, said ad list being periodically updated based on the number of times an ad has been delivered compared to its goal.

18. The system of claim 11 wherein the processor is programmed for using a search tree to determine a correspondence between the particular profile of the particular client and the client profiles of the ads.

19. The system of claim 11 wherein the processor is programmed for recalculating the ad priority for each ad on a periodic basis taking into account any changes in the number of deliveries since the last recalculation.

* * * * *